(12) United States Patent
Burgess et al.

(10) Patent No.: US 7,257,391 B2
(45) Date of Patent: Aug. 14, 2007

(54) WIRELESS DATA SYSTEM

(75) Inventors: Thomas Burgess, Newport, RI (US); Timothy Jemison, Newport, RI (US)

(73) Assignee: Zoove Corp., Palo Alto, CA (US)

( * ) Notice: Subject to any disclaimer, the term of this patent is extended or adjusted under 35 U.S.C. 154(b) by 897 days.

(21) Appl. No.: 10/400,196

(22) Filed: Mar. 26, 2003

(65) Prior Publication Data

US 2004/0014454 A1   Jan. 22, 2004

Related U.S. Application Data

(60) Provisional application No. 60/367,606, filed on Mar. 26, 2002.

(51) Int. Cl.
*H04M 3/42* (2006.01)
(52) U.S. Cl. .............. 455/414.1; 455/414.2; 455/422.1; 455/456.1; 455/456.3; 455/456.5; 455/456.6; 455/458; 705/14
(58) Field of Classification Search .......... 455/414.1, 455/414.2, 422.1, 456.1, 456.3, 456.5, 456.6, 455/458; 705/14

See application file for complete search history.

(56) References Cited

U.S. PATENT DOCUMENTS 5,692,039 A   11/1997   Brankley et al. .......... 379/229
5,752,186 A   5/1998   Malackowski et al. ..... 455/414

(Continued)

FOREIGN PATENT DOCUMENTS

WO    WO 01/11507    2/2001

(Continued)

*Primary Examiner*—Quynh H. Nguyen
(74) *Attorney, Agent, or Firm*—Weingarten, Schurgin, Gagnebin & Lebovici LLP

(57) ABSTRACT

A system and method for enabling a user to request and receive product information, participate in voting or polling activities, reprint an article or other publication, request and authorize a purchase of a magazine subscription, music sound clip, or other product, and/or share personal information with other users. The service request and information delivery may provided over a mobile phone. The user dials a series of digits into their phone and enters them into the disclosed system, for example by pressing the send key on a mobile phone. The digits entered by the user include a prefix or routing code, and a data code. The dialed digits are transferred to a call switching system, which determines, based on the prefix code, a processing system to which a message is sent including the originally dialed digits as well as identification of the user or phone that placed the call. The processing system may then determine, based on the identification of the mobile phone that placed the call, a user account. The processing system further determines, based on the data code of the dialed digits, the product information or other service such as entry of a polling response, vote, or product purchase, that is to be provided. The user account information may then be used to determine a delivery technique, such as electronic mail using an electronic mail address associated with the phone that made the call, SMS/MMS/EMS Text messaging, or WAP push, through which the product information associated with the data code may be forwarded to the requesting user.

18 Claims, 3 Drawing Sheets

U.S. PATENT DOCUMENTS

| | | | |
|---|---|---|---|
| 5,838,768 A | 11/1998 | Sumar et al. | 379/89 |
| 5,852,775 A * | 12/1998 | Hidary | 455/412.1 |
| 5,898,917 A | 4/1999 | Batni et al. | 455/564 |
| 6,167,435 A | 12/2000 | Druckenmiller et al. | 709/206 |
| 6,397,057 B1 | 5/2002 | Malackowski et al. | 455/414 |
| 6,990,472 B2 | 1/2006 | Rosenhaft et al. | 705/77 |
| 6,993,326 B2 * | 1/2006 | Link et al. | 455/414.1 |
| 2001/0039191 A1 | 11/2001 | Maierhofer | 455/466 |
| 2002/0013727 A1 | 1/2002 | Lee | 705/14 |
| 2002/0101975 A1 | 8/2002 | Tiburtius et al. | 379/221.08 |
| 2002/0164977 A1 | 11/2002 | Link, II et al. | 455/414 |
| 2003/0028430 A1 | 2/2003 | Zimmerman | 705/14 |
| 2003/0028441 A1 | 2/2003 | Barness et al. | 705/26 |

FOREIGN PATENT DOCUMENTS

| | | |
|---|---|---|
| WO | WO 01/20478 | 3/2001 |
| WO | WO 01/33464 | 5/2001 |
| WO | WO 01/71949 | 9/2001 |
| WO | WO 01/80583 | 10/2001 |
| WO | WO 02/39765 | 5/2002 |
| WO | WO 02/078316 | 10/2002 |
| WO | WO 02/080592 | 10/2002 |
| WO | WO 02/091252 | 11/2002 |

* cited by examiner

US 7,257,391 B2

WIRELESS DATA SYSTEM

CROSS REFERENCE TO RELATED APPLICATIONS

This application claims priority under 35 U.S.C. §119(e) to provisional patent application Ser. No. 60/367,606, entitled "WIRELESS DATA SYSTEM", and filed Mar. 26, 2002, the disclosure of which is hereby incorporated by reference.

STATEMENT REGARDING FEDERALLY SPONSORED RESEARCH OR DEVELOPMENT

N/A

BACKGROUND OF THE INVENTION

The present invention relates generally to wireless communication systems, and more specifically to a system and method for a telephone user to obtain information about an advertised product or service, participate in voting or polling activities, reprint an article or other publication, request and authorize a purchase of a magazine subscription, music sound clip, or other product, and/or share personal information with other users.

Marketers of various types of goods and services must be able to communicate product information to potential customers. Great efforts have been made to provide product information in ways that are effective, in terms of who the information is provided to, and the nature of the information provided. The difference between effective and ineffective product marketing campaigns often hinges on the specific advertising techniques used.

Various specific forms of advertising are currently in use, including television, radio, print, on-line and billboard advertising. In many cases, the people exposed to a given advertisement have differing degrees of interest in the product or service being advertised. For example, some of the people that see a billboard advertising a certain product might be completely uninterested in buying the advertised product, while others might become interested in obtaining more information about the product. In existing advertising approaches, when a potential customer desires further information regarding an advertised product, they must take some sort of affirmative step to obtain such information. The required step might be calling a toll-free "800" telephone number given in the advertising itself, or entering a URL web address later on their PC at home. However, such approaches are often inconvenient, since the telephone number must be quickly memorized, and the necessary call involves a voice conversation that provides more information about the product. The time at which the advertisement is seen or heard may not be a time when the potential customer can conveniently place the call. Additionally, if sufficient time passes after a toll-free telephone number is seen (and possibly recorded by the customer in some way), the potential customer may forget about it completely, and the call may never be placed. Other advertised sources of additional product information, such as Web sites, suffer from similar problems, since they require the potential customer to maintain interest in the product after exposure to the initial advertisement until a later point in time when the additional information can be expressly obtained. Remembering long and complex URLs for web sites after the initial advertising exposure has proven to be problematic for advertisers. The point of maximum influence from the advertiser's perspective is in the few seconds after the advertisement has been seen by the consumer. This is the so called emotional connection period and is the point when call to actions are most likely to elicit a response. Moreover, these existing techniques for providing additional product information cannot provide information tailored to an individual requester, since usually a single "800" number or Web site is, at least initially, accessed by all potential customers.

The increasing use and availability of mobile telephones, referred to also as cell phones and/or wireless phones, makes it more convenient for a potential customer to immediately dial an "800" number for additional information regarding an advertised product. However, the time required to obtain information in a voice conversation may still be a deterrent to many people making a call at the time they see the advertisement, since they are often busy driving or performing some other activity that makes placing a lengthy phone call impractical or impossible. Moreover, a potential consumer viewing an advertisement may not have a practical way to record information obtained during a phone call that they could refer to later.

For these reasons and others, it would be desirable to have a system for providing product information to potential customers that does not require them to dial a telephone number and obtain information through a voice based conversation, or be connected to a confusing IVR/Automated Attendant phone system, or remember a long URL, and/or have to enter a URL into a web enabled phone, which may be inconvenient with regard to URL entry. The system should facilitate the provision of personalized product information to potential customers, and minimize the resources used to provide such information, such as telephone system bandwidth. Additionally, the system should be convenient to set up for a given advertiser and/or product, and minimize the time required of the potential customer to request the information.

BRIEF SUMMARY OF THE INVENTION

A system and method are disclosed that enable users to request and receive product information, participate in voting or polling activities, reprint an article or other publication, request and authorize a purchase of a magazine subscription, music sound clip, or other product, and/or share personal information with other users. In one embodiment of the disclosed system, information provided by a user over their telephone is processed to determine a set of information to be provided, and a specific technique to be used to provide that information to the user. To initiate the delivery of the information, the user dials a series of digits into their telephone, for example keying the digits into their cell phone and pressing the send key. In one embodiment, the digits dialed are not a traditional phone number under the standard 10 digit North American Numbering Plan (NANP) format, of NPA-NXX-XXXX. The digits entered by the user include a first set of digits referred to as a prefix or routing code, and a second set of digits referred to as a data code. The dialed digits are transferred to a call switching system, which determines that the prefix code indicates a non-standard call or service, and which further converts the prefix code to an indication or address of an processing system that is pre-configured to handle the call. The call is then routed to the processing system, by way of a message including the originally dialed digits, as well as identification of the phone, for example by way of a Mobile Identification Number (MIN), in some phone systems, and/or other identification of the user that placed the call. The processing system then determines, based on the identification of the phone or user that placed the call, whether there is a previously established user account associated with the caller. If not, then the processing system sends a message to the switching system requesting that the call be transferred via a voice connection to a call center, through which the user can establish an account. Otherwise, if there is a previously established user account associated with the mobile phone through which the call was placed, then the data code of the dialed digits is used to identify the product information that is to be provided, and the user account associated with the phone is used to determine an information delivery technique.

In one embodiment, the user account defines the information delivery technique as an electronic mail address associated with the mobile phone that made the call, and the product information associated with the data code is forwarded in an electronic mail message to that electronic mail address. Other delivery techniques might, for example, include a fax machine number to which a fax message containing the product information is to be sent, an SMS (Short Message Service) text message, a WAP (Wireless Application Protocol) push, or traditional postal system mail. A confirmation signal may be provided to the caller indicating that the transaction has been successfully completed, and the associated product information will be or has been sent.

The disclosed system advantageously handles requests for information from users that have established accounts without the need for establishing a voice connection, and also allows first time users to be connected to a voice connection with a call center to establish an account. The disclosed system also does not require the user to initiate their request with any other interface except for the standard 12 digit keypad of their phone. Further, there is no need for mobile phone interfaces/protocols such as WAP, SMS or iMode. The user just dials and sends the necessary digits on any mobile phone, and the disclosed system processes the request in the network—not in the handset or phone. For a user having previously established an account, the requested product information is identified by the data code in the dialed digits, and then automatically forwarded to the user based on information in the account, without requiring further action by the user. If the product information was successfully identified and forwarded, the user is automatically notified that the request has been satisfied by a signal such as a special beep, voice confirmation, or customized response (voice or beep, etc.) based on the user's account information. The disclosed system may be operated from any mobile phone, and does not require new hardware within the telephone carrier's network. Once the prefix code is configured into the carrier system, all product information associated with specific data codes can be managed external to the carrier system. Once a user has established an account, there is no need for them to reenter their contact information each time they request product information, and the product information provided can be of significantly greater size and richer content than can be provided to mobile phone users over existing SMS (Short Message Service) systems, which are limited by the small screen size and the limited user interface available through the phone/handset. Additionally, the user's electronic mail address or any other kind of contact information need never be transferred to the advertiser, thus preserving the user's privacy. A proxy address may be provided to the advertiser to support ongoing marketing efforts, but the use of a proxy address prevents the user's actual electronic mail address from being sold or used unscrupulously by the advertiser. Moreover, the user's actual identity need never be shared with the advertiser.

Thus there is disclosed a system and method providing product information to potential customers without requiring them to dial a toll free telephone number to obtain the information through a voice based conversation or other type of voice connection such as provided through IVR/Automated phone system services. The disclosed system also facilitates the provision of personalized product information to potential customers, and minimizes the resources used to provide such information. The disclosed system is convenient to set up for a given advertiser and/or product, and minimizes the time required to request the desired information. Whereas in existing systems a telephone call request would be routed in a conventional way using a traditional voice circuit, the disclosed system operates in certain scenarios, such as where a registered caller places a request, without using any voice circuit to satisfy the request.

BRIEF DESCRIPTION OF THE SEVERAL VIEWS OF THE DRAWING

The invention will be more fully understood by reference to the following detailed description of the invention in conjunction with the drawings, of which.

DETAILED DESCRIPTION OF THE INVENTION

All disclosures of provisional patent application Ser. No. 60/367,606, entitled "WIRELESS DATA SYSTEM", and filed Mar. 26, 2002, are hereby incorporated by reference herein.

Figure 1:
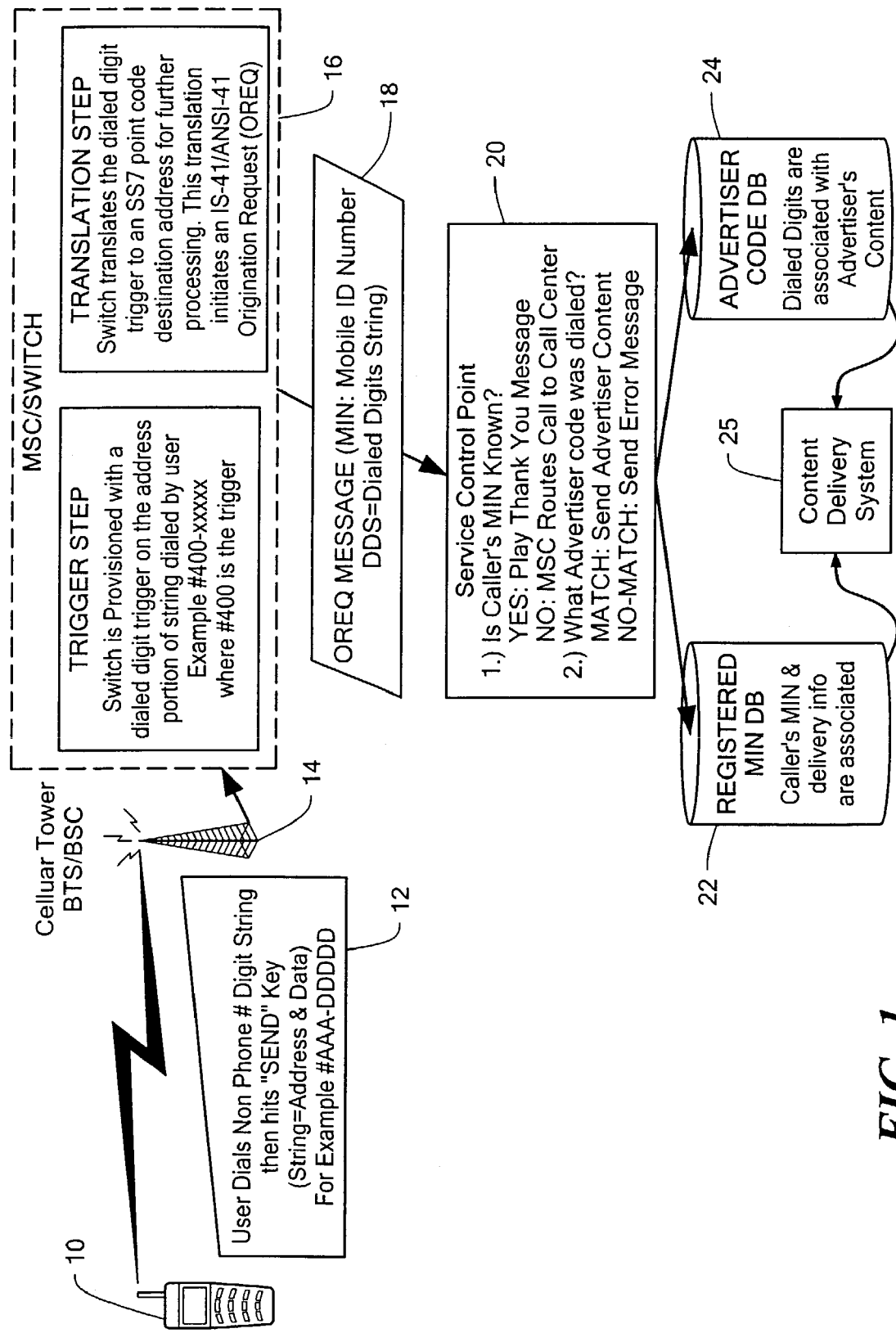
FIG. 1 illustrates an embodiment of the disclosed system.

FIG. 1 shows an illustrative embodiment of the disclosed system, in which a mobile telephone user requests product information via a mobile phone. As shown in FIG. 1, a user of a mobile phone 10 dials 12 a string of digits that is a non-telephone number, followed by the "SEND" key, or presses some other key, or performs some other action, as may be required to submit the dialed digits. The disclosed system may be embodied, for example, such that a predetermined button is dedicated within the phone or mobile phone interface for accessing the disclosed system or similar systems, in order to obtain product information. For example, the string of digits dialed by the user may include a first portion referred to as a prefix code or address part, as well as a second portion referred to as a data code or advertiser code. The dialed digit string entered by the mobile phone user may be obtained by the user through a variety of techniques, such as placement within some form of advertisement for a related product and/or service. The advertisement may appear in any manner of media such as print (Magazine/Newspaper), TV/radio, direct mail or outdoor/indoor billboard advertising, and/or Internet based or other type of electronic advertising. For example, there are many kiosks, elevators, gas stations etc. that offer advertising that may not allow direct interactivity, but which can provide the dialed digit string. The product information obtained using the disclosed system thus may be information related to a product or service described in such advertisements.

Those skilled in the art will recognize that while the embodiments provided herein are described with regard to the use of mobile phones to enter the dialed digits, the disclosed system is not so limited. Accordingly, the dialed digits including the prefix and data codes may alternatively be provided through standard land line telephones.

The dialed digit string is then transferred from the mobile phone 10 to a cellular tower 14, and forwarded from the cellular tower 14 to a mobile switching center (MSC) 16. As will be apparent to those skilled in the art, the switching center 16 may include one or more processors and associated software and/or firmware, as well as program storage devices for storing such software and/or firmware, various input/output interfaces, and customized, application specific hardware circuitry. The switching center 16 operates to perform a trigger step, which determines special processing that is to be performed in response to the prefix code within the dialed digit string. In this regard, the switching center 16 is provisioned with a dialed digit trigger associated with dialed digit strings including the predetermined prefix code, for example #400. When a call is received by the switching center 16 that includes the predetermined prefix code, in this case #400, within the dialed digit string of the call, the switching center 16 performs a translation step in which the switching center 16 determines a point code destination address for further processing of the call. The translation step identifies an SS7 network point referred to as an SCP (Service Control Point). The SCP is reached via an SS7 addressing scheme called point codes, similar in nature to IP addresses on the Internet. Using the point code destination address determined in this way, the switching center 16 initiates a request message to be sent to a system that is responsible for further processing of the call. For example, the request message may consist of an IS-41/ANSI-41 Origination Request (OREQ) message. While in the case of a CDMA type intelligent network, an OREG message may be used, alternatively, an equivalent message may be used within a GSM-MAP (Global Systems For Mobile Communication—Mobile Application Part) system using the CAMEL (Customized Applications for Mobile Enhanced Logic) application protocol. As shown in FIG. 1, the request message 18 may, for example, be an OREQ message including a number of parameters, including a MIN (Mobile Identification Number) that identifies the mobile phone from which the call placed, as well as a DDS (Dialed Digits String) parameter storing the dialed digits entered by the user.

The request message 18 transmitted by the switching center 16 is received by the SCP (Service Control Point) system 20. The SCP 20 may include one or more server computer systems, each of which may include one or more processors and associated software and/or firmware, as well as program storage devices for storing such software and/or firmware, various input/output interfaces, and customized, application specific hardware circuitry. The SCP 20 processes the received request message 18 by first determining whether the MIN in the request message is associated with a previously established user account. If so, then the MIN is considered a known MIN, and the SCP 20 causes a "Thank You" message to be played back to the user indicating that the request for product information will be processed. Such a "Thank You" message may, for example, be provided completely through the signaling mechanisms of the underlying SS7 network, and does not require establishment of a voice connection. However, alternatively, a voice connection to an IVR (Interactive Voice Response) system may be used to provide a "Thank You" message to the user indicating that the request has been satisfied. Moreover, some other kind of signal may be used in this regard, such as a beep or tone provided to the user indicating completion of the request.

In the case where the MIN in the request message 18 is not associated with a user account that has previously been established, the SCP 20 operates to route the call to a call center via a voice connection, through which a call center operator can obtain information from the caller with which a user account can be established for the caller. Such information may include, for example, a delivery technique to be associated with the caller, such as an electronic mail (e-mail) address. As shown in FIG. 1, a Registered MIN Database 22 is used to store user account information, and to associated MINs with corresponding user accounts.

Further within the service SCP 20, a determination is made as to the specific product information or other action that is associated with the data code within the dialed digits string included in the request message. For purposes of illustration, the data code within the dialed digits string may be associated with a specific corresponding portion of advertiser's content, and thus the data code may also be referred to as an "advertiser code" within the dialed digits string. As shown in FIG. 1, an Advertiser Code Database 24 may be used to associate data codes with specific product information, such as advertiser provided content. In the event that the SCP 20 determines that there is product information associated with the data code in the dialed digits string, then the SCP 20 sends the product information to the user that dialed the call through the content delivery system (CDS) 25 using a delivery technique indicated by the information in the user account associated with the MIN in the request message 18. For example, the information stored in a user account may indicate that the delivery technique to be used to deliver the product information associated with the data part of the dialed digits string is electronic mail, and further include an electronic mail address to be used as a destination address to deliver the product information to the user. Other delivery techniques may include facsimile delivery, in which case the user account may include a facsimile machine number that is to be called for the delivery of the product information. Additionally, the delivery technique may be SMS (Short Message Service), in which case the product information stored in the Advertiser Code Database consists of a text message to be delivered back to the mobile phone on which the original call was placed using the SMS protocol. Other examples of delivery techniques that may be used include a WAP (Wireless Application Protocol) push, or a MMS (Multi-media Messaging Service) message, or an EMS (Enhanced Messaging Service) message, or some other appropriate delivery technique.

Figure 2:
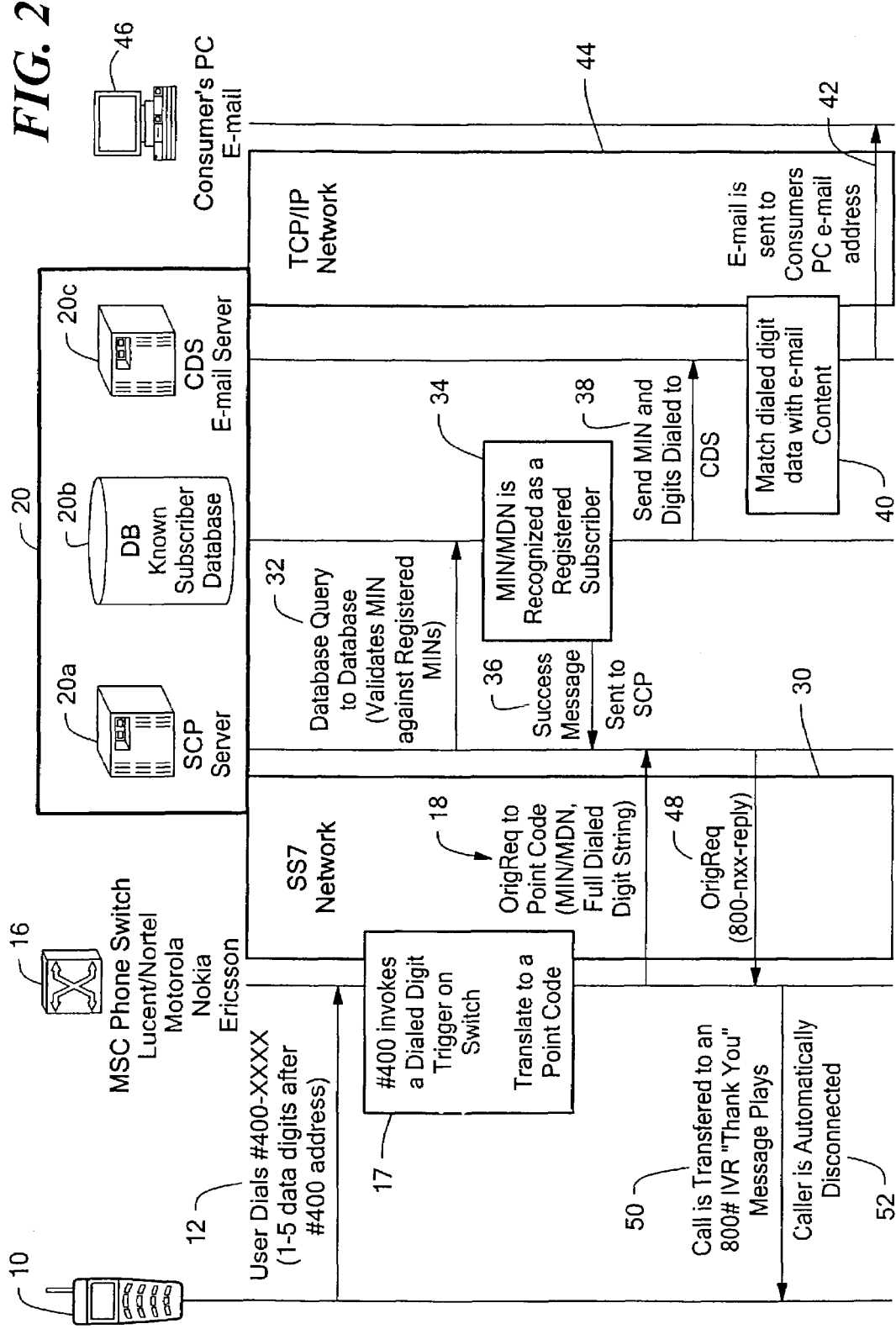
FIG. 2 illustrates a first example of operation of the disclosed system.

FIG. 2 illustrates a first example of operation of an embodiment of the disclosed system. As shown in FIG. 2, the user dials 12 a dialed digit string including a prefix code such as #400, and also a data code, shown for purposes of illustration as a set of 1-5 digits following the prefix code. The length of the data code may vary across different embodiments, for example between 1 and 12 digits. An MSC switching center 16 receives the call, and determines 17 based on the prefix code in the dialed digit string that a dialed digit trigger is to be invoked on the switching center 16, which translates the prefix code into a point code indicating an SS7 network destination such as a service control point. As a result, a request message, such as an OREQ message 18, including the mobile identification number (MIN) of the mobile phone used to place the call, as well as the full dialed digit string entered into the mobile phone by the user, is sent across the SS7 network 30 to the SCP 20. An SCP server system 20a then issues a database query 32 to a known subscriber database 20b within the SCP 20, which validates the MIN in the OREQ message 18 against the set of MINs that are associated with existing user accounts. The known subscriber database 20b then determines whether the MIN in the OREQ message 18 is associated with an existing subscriber account. For purposes of explanation, as shown in FIG. 2, the database 20b determines 34 that the MIN in the OREQ message 18 is recognized as being associated with a registered user. Accordingly, the MIN and the dialed digits string from the OREQ message 18 are sent 38 to a content delivery system (CDS) 20c, that includes an e-mail server. As will be apparent to those skilled in the art, the SCP server 20a, known subscriber database 20b, and CDS system 20c may each include one or more processors and associated software and/or firmware, as well as program storage devices for storing such software and/or firmware, various input/output interfaces, and customized, application specific hardware circuitry.

In response to the MIN and digits dialed string sent to the CDS system 20c, the CDS system 20c operates to match 40 the data code within the dialed digit string with product information content that is to be delivered to the user. The CDS system 20c then sends 42 an e-mail message over a TCP/IP Network 44, such as the World Wide Web, to the e-mail address associated with the user's account. Thus an e-mail message delivers product information, including any appropriate or suitable content, including HTML (Hyper-Text Mark-up Language) or other content types, to the user's personal computer (PC) 46.

Further in response to the determination 34 that the MIN in the OREQ message 18 is associated with an established user account, the database 20b sends a success message 36 to the SCP server 20a. The SCP server 20a then sends a message 48 to the switching center 16 indicating that the request for product information has been successful. The message 48 may, for example consist of a Origination Request (OREQ) message requesting the switching center 16 to transfer the call to an IVR (Interactive Voice Response) system which plays a "Thank You" message 50, or that provides some other kind of indication that the information request has been processed. The call is then automatically disconnected 52, after using only a few seconds of the network's airtime to complete the requested transaction.

Figure 3:
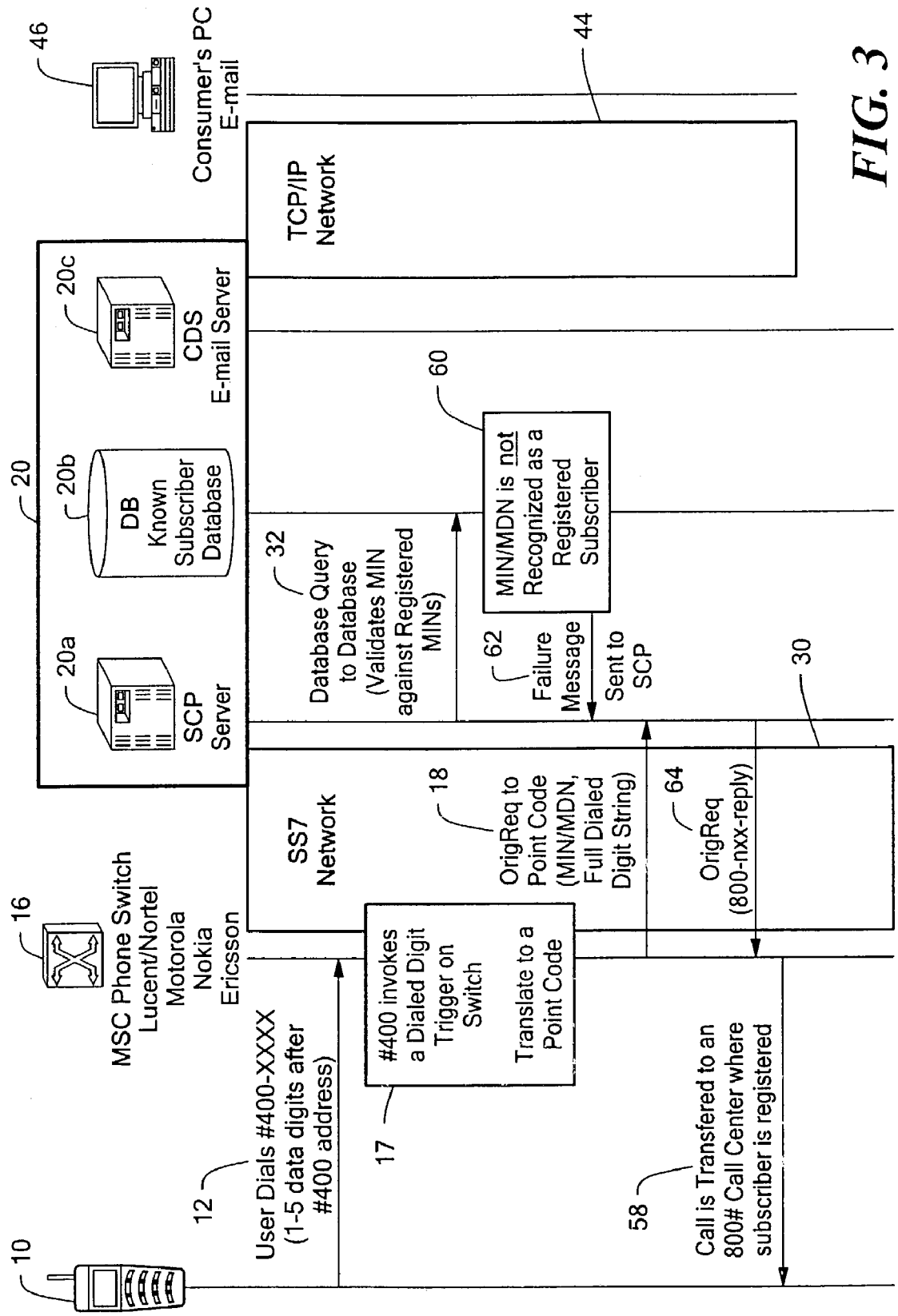
FIG. 3 illustrates a second example of operation of the disclosed system.

FIG. 3 illustrates another example of operation of an embodiment of the disclosed system. As shown in FIG. 3, the user dials the prefix code (for example #400), followed by the data code (for example 1-5 digits following the prefix code) on their mobile phone 10, and hits the send key. The call is received by the switching center 16, which invokes 17 a dialed digit trigger to translate the prefix code of the dialed digits string to a point code. The switching center 16 then sends a request message 18 (shown for purposes of illustration as an OREQ message) across the SS7 network 30 to the SCP 20, at which the request message 18 is received by the SCP server 20a. The SCP server 20a then sends a database query 32 to the known database subscriber database 20b, which determines whether the MIN in the request message 18 is associated with an established user account. For purposes of explanation, FIG. 3 illustrates the case where the database 20b indicates that the MIN in the request message 18 is not associated with an established user account. Accordingly, a failure message 62 is sent to the SCP server 20a, which then sends a message 64 indicating that the product information request has failed. The message 64 is shown for purposes of illustration as an OREQ message that will transfer 58 the call to a call center where information can be obtained from the user to establish a new account. Alternatively, an SMS text message may be generated and sent requesting that the user to reply with their e-mail address, in lieu of connection to the call center in the case where a determination is made that the user has SMS capability.

Thus there is disclosed a system and method by which a user can enter into their cellular or landline phone, a series of digits from an advertisement as a method for the potential consumer obtain additional information. The potential applications of the disclosed system are many and varied, and include allowing the user to request additional information about a particular product or service, participate in voting or polling activities, reprint an article or other publication, request and authorize a purchase of a magazine subscription, music sound clip, or other product, and/or share personal information with other users As described in the illustrative embodiment above, once a user has entered the required digits and presses the send key on their mobile phone, the requested product information is automatically sent to the user without any need for the user to hear a ring tone or for the call to "connect" or be answered in the traditional manner of a typical voice call. The act of dialing the digits and pressing send is all that is needed to process the users' request.

Moreover, the illustrative embodiment of the disclosed system may operate without making a voice call, but instead using part of the SS7 signaling channel the phone system normally used for call setup and call tear-down. In the disclosed system, the switching center 16 recognizes the call as a data request call, as opposed to a voice call, in response to the prefix code within the series of digits entered by the user. The switching center 16 makes this determination in part based on the inclusion of a non-numeric/alphabetical digits such as the * key or the # key, preceding the prefix code. Using this or some other specific format, the dialed digits entered by the user are divided into two parts: an addressing section, referred to as the prefix code or prefix part, for example beginning with a predetermined non-numeric/alphabetical digit such as * or #, followed by some number of digits, for example up to 12 digits, referred to as the data code or advertiser code, and representing the coded request from the user for specific associated product information.

System Extensions

Various additional enhancements may be provided with regard to the disclosed system. For example, an extension of the disclosed technology enables the remote control of cable television set top boxes to be used to enter digit strings including the predetermined prefix code and data code used as described above, in order to determine product information that is to be delivered to the user. Using such an embodiment, a user watching television could respond to an advertisement by simply pushing keys on their remote control, and the set top box would send the request message upstream to the cable company, where a server operates to provide the product information to the user, for example through an e-mail message.

In another embodiment, the disclosed system can support voting or polling, for example by enabling the user to dial first predetermined digit string, such as #NBC™-1, for Yes, and a second predetermined digit string, such as #NBC™-2, for No in response to a poll or to enter a vote. Similarly, another predetermined string, such as #CBS™-3 could be used to indicate selection of answer #3 in a multiple choice answer question in response to TV or Radio poll questions. The disclosed system does not require the user to dial an 800 number, get up from the TV and go to a PC with Web access. Additionally, the disclosed system does not require an SMS text message or WAP interface on the user's phone in order for the user to participate in a vote.

Other applications of the disclosed system will also be apparent to those skilled in the art. For example, the prefix code portion of the dialed digits may indicate a variety of services other than requesting product information delivery. For example, the below prefix codes, which correspond to keypad characters also indicative of the type of information requested, could be used to request other kinds of information when entered into a mobile phone:

| | |
|---|---|
| #200 (#C00) | Request a user's contact information |
| #400 (#I00) | Request Additional Product Information |
| #600 (#M00) | Request Restaurant Menus |
| #700 (#R00) | Request Article Reprints |
| #730 (#RE0) | Request Info on Real Estate |
| #800 (#V00) | Participate in a Poll or Vote |
| #900 | Request Product Information inside Store |
| #768 (#PMT) | POS (Point of Sale) Payment in Stores |

The above #XXX format prefix codes are given for purposes of explanation only, and the disclosed system is not limited to such an embodiment. For example, the different services that may be provided through the disclosed system do not have to be distinguished by different prefix codes, but may alternatively be distinguished by the value of the data code. Moreover, the specific services given above for purposes of explanation are not to be considered an exhaustive list of the services that may be provided using the disclosed system. Other services, such as subscription services regarding magazines, or credit card requests, and/or special document requests for documents such as tax forms or other legal forms, requests for stock quotes, annual or quarterly reports, or other financial information, are also examples of services that may also or alternatively be provided using the disclosed system.

System Advantages

The disclosed system provides many advantages over prior systems. From an advertiser's standpoint, the disclosed system provides highly valuable marketing techniques and data gathering capabilities. For instance, the disclosed system may provide the ability to accurately monitor overall effectiveness of outside advertising. Additionally, the disclosed system promotes true interactivity with traditional advertisements without requiring special mobile interfaces/protocols such as WAP, SMS or iMode. Accordingly, every mobile phone user can use the disclosed system. This is in contrast to WAP or SMS based systems which require a particular type of handset, specific knowledge of an interface that is different on every phone, and that may require explicit activation or subscription by the user.

Another advantage of the disclosed system is its ability to track the activities of and continue to market to a registered consumer. The disclosed user accounts can be used to automatically collect, process and catalog all consumer transaction data. Such collected data may then be made available in real-time via a web based data portal that can be securely accessed by an advertiser or their agency.

Another possible extension enables users to share personal and/or business information. A predetermined prefix code, for example #200, may be entered by a user that desires to share their personal and business contact information with other individuals. In such an embodiment, any user that chooses to store their contact information in their user account can make it available to other users with whom they share their access code. For example, if a user stores their contact information in their user account, another user could simply ask them for their personal contact access code, which would serve as the data code portion of the dialed digits when the disclosed system is accessed via mobile phone. Accordingly entering the predetermined prefix code followed by the personal contact access code (i.e. as a dialed digit string of #2004567, where #200 is the predetermined prefix code and 4567 is the access code) into a cell phone, and then hitting "send", would cause the disclosed system to send an electronic mail message to the caller including the contact information for the user identified by the personal contact access code 4567.

Another predetermined prefix code may be used to cause the disclosed system to provide reprints of articles. For example, the prefix code #700 may be used to request a reprint of an article identified by the contents of the data code dialed. In this way, magazines, newspapers and other periodicals can provide "re-prints" for a fee to individuals interested in additional copies of articles. Utilizing this feature of the disclosed system, periodicals can label each articles with a specific data code (i.e. 345), catalog the list of data codes and articles on a database accessible to the disclosed system, and offer them for a fee to mobile phone users who would like a copy sent to their e-mail address.

Those skilled in the art should further appreciate that programs defining the functions of the disclosed system and method can be implemented in software and delivered to a system for execution in many forms; including, but not limited to: (a) information permanently stored on non-writable storage media (e.g. read only memory devices within a computer such as ROM or CD-ROM disks readable by a computer I/O attachment); (b) information alterably stored on writable storage media (e.g. floppy disks and hard drives); or (c) information conveyed to a computer through communication media for example using baseband signaling or broadband signaling techniques, including carrier wave signaling techniques, such as over computer or telephone networks via a modem. In addition, while the illustrative embodiments may be implemented in computer software, the functions within the illustrative embodiments may alternatively be embodied in part or in whole using hardware components such as Application Specific Integrated Circuits, Field Programmable Gate Arrays, or other hardware, or in some combination of hardware components and software components.

While the invention is described through the above exemplary embodiments, it will be understood by those of ordinary skill in the art that modification to and variation of the illustrated embodiments may be made without departing from the inventive concepts herein disclosed. Accordingly, the invention should not be viewed as limited except by the scope and spirit of the appended claims.

What is claimed is:

1. A method for providing product information to a mobile phone user, comprising:

receiving a request message, wherein said request message includes indication of said mobile phone user and a dialed digit string entered by said mobile phone user into a mobile phone, wherein said dialed digit string includes a data code;

determining whether said indication of said mobile phone user is associated with one of a plurality of established user accounts;

determining, in the event that said indication of said mobile phone user is determined to be associated with one of said plurality of established user accounts, and responsive to said data code, a portion of product information stored in a database;

determining, in the event that said indication of said mobile phone user is determined to be associated with one of said plurality of established user accounts, and responsive to information stored in said one of said plurality of said established user accounts, a product information delivery technique associated with said mobile phone user; and delivering, in the event that said indication of said mobile phone user is determined to be associated with one of said plurality of established user accounts, and responsive to said product information delivery technique associated with said mobile phone user, said portion of product information stored in said database using said product information delivery technique associated with said mobile phone user.

2. The method of claim 1, further comprising:

in the event that said indication of said mobile phone user is determined not to be associated with one of said plurality of established user accounts, establishing a voice communication link to a call center to facilitate establishment of a new user account.

3. The method of claim 1, further comprising:

providing, responsive to said delivering of said product information to said mobile phone user, a transaction completed signal to said mobile phone user.

4. The method of claim 1, further comprising:

wherein said product information delivery technique associated with said mobile phone user comprises electronic mail;

wherein said one of said plurality of user accounts includes an electronic mail address associated with said mobile phone user; and wherein said delivering of said portion of product information to said mobile phone user includes sending said portion of product information to said electronic mail address.

5. The method of claim 1, further comprising:

wherein said product information delivery technique associated with said mobile phone user comprises facsimile delivery;

wherein said one of said plurality of user accounts includes a facsimile machine number associated with said mobile phone user; and wherein said delivering of said portion of product information to said mobile phone user includes sending said portion of product information to said facsimile machine number.

6. The method of claim 1, wherein said indication of said mobile phone user comprises an identification number associated with said mobile phone.

7. The method of claim 1, further comprising determining, responsive to a prefix code included in said dialed digit string entered by said mobile phone user into said mobile phone, a service control point to which to send said request message.

8. The method of claim 1, wherein said request message is an origination request message.

9. The method of claim 1, further comprising sending an error message to said mobile phone user in the event that no product information is associated with said data code.

10. The method of claim 1, further comprising:

wherein said product information delivery technique associated with said mobile phone user comprises short message service; and wherein said delivering of said portion of product information to said mobile phone user includes sending said portion of product information using short message service.

11. A system for providing product information to a mobile phone user, including at least one computer system having at least one processor and associated program storage on a tangible computer-readable medium, said program storage having computer program code stored thereon, said computer program code comprising:

program code for receiving a request message, wherein said request message includes indication of said mobile phone user and a dialed digit string entered by said mobile phone user into a mobile phone, wherein said dialed digit string includes a data code;

program code for determining whether said indication of said mobile phone user is associated with one of a plurality of established user accounts;

program code for determining, in the event that said indication of said mobile phone user is determined to be associated with one of said plurality of established user accounts, and responsive to said data code, a portion of product information stored in a database;

program code for determining, in the event that said indication of said mobile phone user is determined to be associated with one of said plurality of established user accounts, and responsive to information stored in said one of said plurality of said established user accounts, a product information delivery technique associated with said mobile phone user; and program code for delivering, in the event that said indication of said mobile phone user is determined to be associated with one of said plurality of established user accounts, and responsive to said product information delivery technique associated with said mobile phone user, said portion of product information stored in said database using said product information delivery technique associated with said mobile phone user.

12. A system for providing product information to a mobile phone user, comprising:

means for receiving a request message, wherein said request message includes indication of said mobile phone user and a dialed digit string entered by said mobile phone user into a mobile phone, wherein said dialed digit string includes a data code;

means for determining whether said indication of said mobile phone user is associated with one of a plurality of established user accounts;

means for determining, in the event that said indication of said mobile phone user is determined to be associated with one of said plurality of established user accounts, and responsive to said data code, a portion of product information stored in a database;

means for determining, in the event that said indication of said mobile phone user is determined to be associated with one of said plurality of established user accounts, and responsive to information stored in said one of said plurality of said established user accounts, a product information delivery technique associated with said mobile phone user; and means for delivering, in the event that said indication of said mobile phone user is determined to be associated with one of said plurality of established user accounts, and responsive to said product information delivery technique associated with said mobile phone user, said portion of product information stored in said database using said product information delivery technique associated with said mobile phone user.

13. A method for providing product information to a telephone user, comprising:

receiving a request message, wherein said request message includes indication of said telephone user and a dialed digit string entered by said telephone user into a telephone, wherein said dialed digit string includes a data code;

determining whether said indication of said telephone user is associated with one of a plurality of established user accounts;

determining, in the event that said indication of said telephone user is determined to be associated with one of said plurality of established user accounts, and responsive to said data code, a portion of product information stored in a database;

determining, in the event that said indication of said telephone user is determined to be associated with one of said plurality of established user accounts, and responsive to information stored in said one of said plurality of said established user accounts, a product information delivery technique associated with said telephone user; and delivering, in the event that said indication of said telephone user is determined to be associated with one of said plurality of established user accounts, and responsive to said product information delivery technique associated with said telephone user, said portion of product information stored in said database using said product information delivery technique associated with said telephone user.

14. A method for processing a service request from a telephone user, comprising:

receiving a telephone call from said telephone user;

determining, responsive to a dialed digit string associated with said telephone call, that said telephone call is not a conventional voice telephone call, and wherein said dialed digit string includes a data code;

determining whether said indication of said mobile phone user is associated with one of a plurality of established user accounts;

determining, in the event that said indication of said mobile phone user is determined to be associated with one of said plurality of established user accounts, and responsive to said data code, a portion of product information stored in a database;

determining, responsive to said dialed digit string associated with said telephone call, a processing system to process said service request;

forwarding a request message to said processing system, wherein said request message includes an indication of said telephone user and said dialed digit string, wherein said dialed digit string includes a data code;

receiving said request message at said processing system;

determining, by said processing system, and responsive to said dialed digit string, a requested service; and providing said requested service, by said processing system, to said user without establishment of a voice connection.

15. The method of claim 14, wherein said requested service is entry of a vote indicated by a value of said data code.

16. The method of claim 14, wherein said requested service is providing information associated with another user responsive to a value of said data code.

17. The method of claim 14, wherein said requested service is a purchase of a predetermined product associated with said data code.

18. A method for providing product information to a mobile phone user, the method comprising the steps of:

receiving a request message, wherein said request message includes indication of said mobile phone user and a dialed digit string entered by said mobile phone user into a mobile phone, wherein said dialed digit string includes a data code;

determining whether said indication of said mobile phone user is associated with one of a plurality of established user accounts;

determining, in the event that said indication of said mobile phone user is determined to be associated with one of said plurality of established user accounts, and responsive to said data code, a portion of product information stored in a database;

determining, in the event that said indication of said mobile phone user is determined to be associated with one of said plurality of established user accounts, and responsive to information stored in said one of said plurality of said established user accounts, a product information delivery technique associated with said mobile phone user;

selecting at least one device, capable of processing one of an electronic copy and a hard copy, preferred by said mobile phone user for delivering said portion of product information; and delivering, in the event that said indication of said mobile phone user is determined to be associated with one of said plurality of established user accounts, and responsive to said product information delivery technique associated with said mobile phone user, at the at least one device preferred by said mobile phone user said portion of product information stored in said database using said product information delivery technique associated with said mobile phone user.

* * * * *